United States Patent [19]

Hellman et al.

[11] Patent Number: 4,474,730
[45] Date of Patent: Oct. 2, 1984

[54] NUCLEAR FUEL SPACER GRID

[75] Inventors: Jeremy M. Hellman, Monroeville; Edmund E. DeMario, Penn Hills, both of Pa.

[73] Assignee: Westinghouse Electric Corp., Pittsburgh, Pa.

[21] Appl. No.: 405,482

[22] Filed: Aug. 5, 1982

[51] Int. Cl.³ .............................................. G21C 3/34
[52] U.S. Cl. ................................... 376/462; 376/441; 376/442
[58] Field of Search ................ 376/441, 452, 448, 462

[56] References Cited

U.S. PATENT DOCUMENTS

| Re. 27,173 | 9/1971 | Lass et al. | |
|---|---|---|---|
| 3,255,091 | 6/1966 | Frisch | 376/441 X |
| 3,338,791 | 8/1967 | Lass et al. | |
| 3,350,275 | 10/1967 | Venier et al. | |
| 3,629,067 | 12/1971 | Demalson et al. | |
| 3,654,077 | 4/1972 | Lass et al. | |
| 3,665,586 | 5/1972 | Jabsen | |
| 3,686,071 | 8/1972 | Gaines | |
| 3,746,618 | 7/1973 | Nakazato | |
| 3,762,996 | 10/1973 | Milburn et al. | 376/442 |
| 3,795,040 | 3/1974 | Jabsen | |
| 3,929,569 | 12/1975 | Piepers et al. | 376/441 |
| 4,059,483 | 11/1977 | Anthony | 376/442 |
| 4,268,356 | 5/1981 | Kmonk et al. | 376/441 X |
| 4,364,902 | 12/1982 | Feutrel | 376/448 X |
| 4,389,369 | 6/1983 | Bryan | 376/442 |

*Primary Examiner*—Richard E. Schafer
*Assistant Examiner*—Daniel Wasil
*Attorney, Agent, or Firm*—D. E. Erickson

[57] ABSTRACT

A nuclear reactor fuel assembly spacer grid. The grid straps form an egg crate configuration creating standard cells to enclose the fuel rods. The standard cells have at least one of their straps with an integral spring portion extending into the standard cell and pushing against the fuel rod. A distinct backup spring is positioned transverse to and behind each of the spring portions of the straps and is positioned so as not to touch the fuel rods. The straps are made of a material having a low neutron capture cross-section while the backup spring is made of a material having good radiation stress relaxation properties.

5 Claims, 5 Drawing Figures

NUCLEAR FUEL SPACER GRID

BACKGROUND OF THE INVENTION

The present invention relates generally to grids for nuclear reactor fuel assemblies and more particularly to an improved bimetallic grid structure which employs a material having a low neutron capture cross section together with a material chosen for its radiation stress relaxation properties.

Nuclear fuel spacer grids are used to precisely maintain the spacing between fuel rods in a nuclear reactor core, prevent rod vibration, and provide lateral support for the fuel rods. Conventional designs of grids for nuclear reactor fuel assemblies include a multiplicity of interleaved straps of egg crate configuration designed to form cells which accept fuel rods (standard cells) and control rod guide thimbles (thimble cells). Each standard cell provides support to one fuel rod at a given axial location through the use of springs and protrusions (called dimples) formed into the metal. A peripheral strap (having the same width as the interleaved straps) encloses the interleaved straps to impart strength and rigidity to the fuel assembly. In order to minimize the lateral displacement of fuel rods and to improve the fuel characteristics of an assembly, a number of grids are spaced along the fuel assembly length. These grids are held in place by bulging or otherwise affixing control rod guide thimble sleeves to the grid.

The existing bimetallic spacer grids employ grid straps, made from a low neutron capture cross-section material, for structural support and use springs mounted thereto, made from a good radiation stress relaxation material, to contact the fuel rods. A "good radiation stress relaxation material" is one which exhibits low stress relaxation during radiation, meaning the material does not suffer a significant loss of resiliency when exposed to intense and prolonged irradiation. The assembly of present bimetallic grids is relatively complicated and time consuming.

Existing unimetallic grid straps which have integral springs are made from a low neutron capture cross-section material. These springs are subject to stress relaxation under irradiation.

SUMMARY OF THE INVENTION

It is an object of the invention to provide a fuel rod spacer grid in a nuclear reactor fuel assembly.

It is another object of the invention to provide a nuclear reactor fuel assembly bimetallic grid using existing unimetallic grid straps having integral springs.

It is an added object of the invention to provide a nuclear fuel bimetallic spacer grid which allows for ease of assembly.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the nuclear fuel spacer grid may comprise an egg crate array of grid straps which create standard cells for separately surrounding each fuel rod. An integral spring portion extends into each of the standard cells from at least one of the straps creating that cell. The spring portion pushes against the fuel rod. The grid also includes distinct backup springs which are singly placed behind and transverse to each of two or more of the grid straps' spring portions. The backup spring is not in contact with the fuel rods.

Preferably the grid straps (including their integral spring portions) are made of a material having a low neutron capture cross section, and the backup springs are made of a material having good radiation stress relaxation properties.

Several benefits and advantages are derived from the invention. The grid's backup spring feature allows the modification of existing unimetallic grid straps to achieve the advantages of bimetallic grid design. The backup spring feature also allows ease of manufacture and assembly of new bimetallic grids to obtain good neutronic characteristics (for the structural part of the grid) together with good radiation resistant characteristics (for the spring area of the grid).

BRIEF DESCRIPTION OF THE DRAWINGS

The accompanying drawing which is incorporated in and forms a part of this specification, illustrates an embodiment of the present invention and, together with a description, serves to explain the principles of the invention. In the drawing.

DETAILED DESCRIPTION OF THE INVENTION

Reference will now be made in detail to the present preferred embodiment of the invention, an example of which is illustrated in the accompanying drawing.

Figure 1:
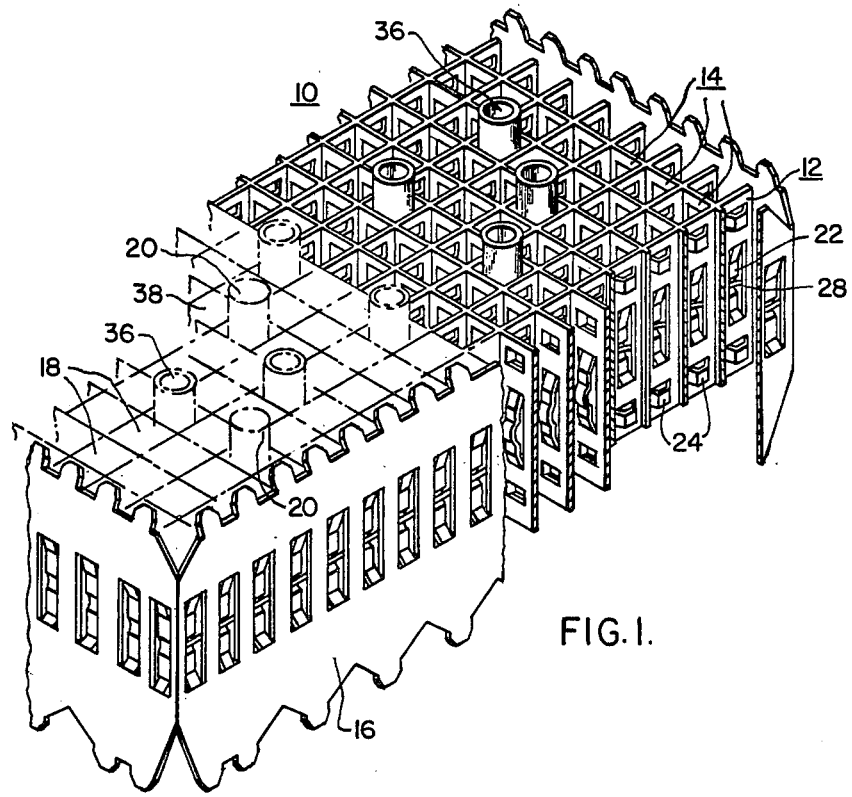
FIG. 1 is an isometric view, partially broken away, of a grid area illustrating the invention.
Figure 1A:
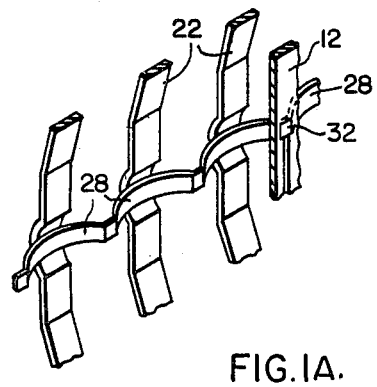
FIG. 1A is an enlarged fragmentary view of a portion of FIG. 1 showing a band of coextensive backup springs in relation to their associated grid strap including spring portions.
Figure 3:
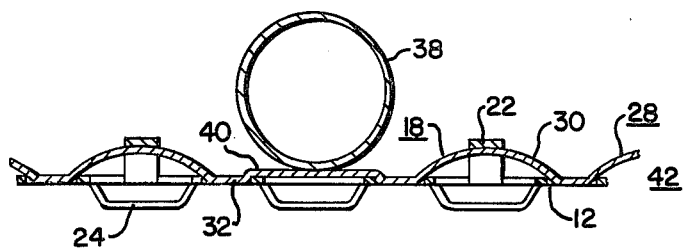
FIG. 3 is a cross-sectional view of the grid strap portion illustrated in FIG. 2 taken along arrows III—III.

In the drawing like reference characters designate like or corresponding parts throughout the several views. There is shown in FIG. 1 a perspective view of an area of a single nuclear reactor fuel assembly grid 10 which includes interleaved straps 12, 14 (enclosed in a peripheral strap 16) which form an egg crate configuration array. The interleaved straps thus define an array of multiple standard cells 18 through which fuel rods 20 (only two of which are shown, for clarity, in FIG. 1) are adapted to extend. Each standard cell surrounds one fuel rod. Each fuel rod 20 is held in place by integral spring portions 22 on two adjacent straps forming part of a standard cell and a pair of axially-spaced dimples 24 on the other two adjacent straps which complete the enclosure of a standard cell to thereby provide a 6 point support to each fuel rod. Other standard cell fuel rod support systems are possible and should have, at a minimum, at least one integral spring portion projecting into its associated standard cell to compressibly contact its associated fuel rod.

FIGS. 1A and 2 through 4 illustrate in more detail the design of the grid strap 12 used for holding fuel rods in position. The integral spring portions 22 are created by deforming material in the middle of the strap 14. The deformation process also includes the formation of dimples 24 above and below the spring portions. Slots 26 are utilized to affect an interlocking engagement with adjacent straps.

The grid 10 also includes backup springs 28 which are distinct from the grid straps 12 and 14. A backup spring 28 is positioned transverse to and behind each of at least two spring portions 22. The backup spring 28 does not touch the fuel rods 20.

Preferably, the backup springs 28 push against their associated spring portions 22. It is desirable that the spring portions 22 are flat springs and are positioned such that the spring portions 22 on a strap are generally parallel and generally transversely colinear. It is better that there is one backup spring behind each spring portion and that neighboring backup springs on a strap are coextensive.

Figure 2:
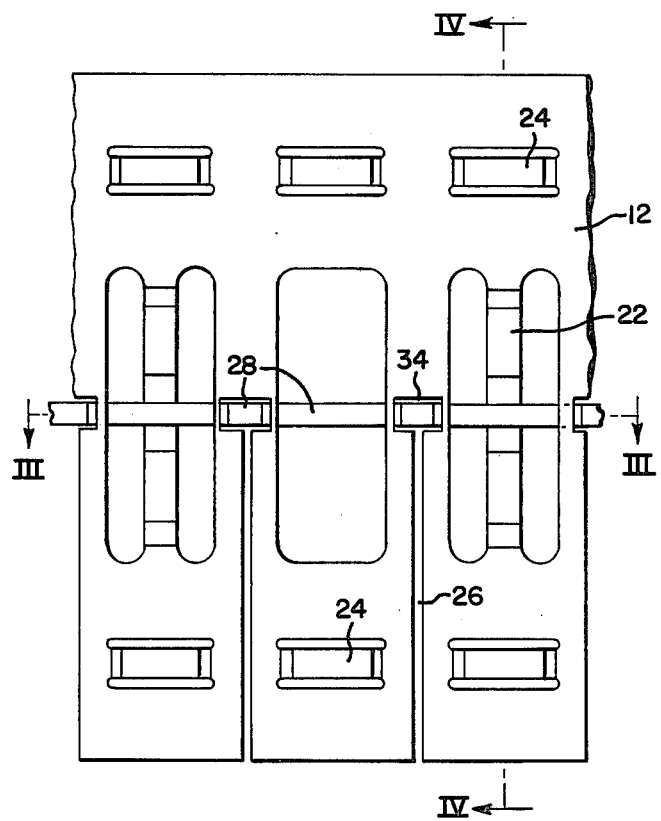
FIG. 2 is a front elevation view of a portion of a grid strap illustrated in FIG. 1.
Figure 4:
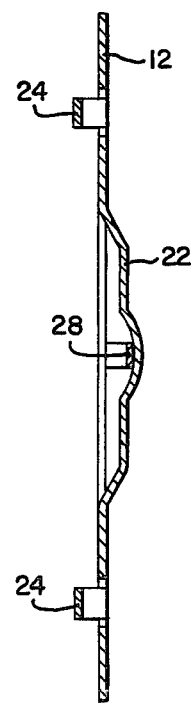
FIG. 4 is a cross-sectional view of the grid strap portion illustrated in FIG. 2 taken along arrows IV—IV.

It is seen from FIG. 2 that preferably the backup spring 28 has an arched configuration with the arch 30 having a foot part 32, and preferably the straps 12 have notches 34 which are generally halfway between each of any two neighboring spring portions 22. The notches 34 lockably engage the backup spring 28 by its foot parts 32 since the backup spring 28 also pushes against the spring portion 22 of the strap 14.

As seen in FIG. 1, the grid 10 also provides for the spacing of the control rod guide thimbles 36. The straps 12 and 14 in their egg crate configuration also define thimble cells 38 to enclose the control rod guide thimbles 36. Each thimble cell surrounds one control rod guide thimble. As seen from FIG. 2, in the case of a thimble cell, neighboring backup springs 28, associated with a strap 12, also have coextensive generally flat portions 40. These flat portions 40 are coextensive with each other so that there is provided a single planar backup spring band 42, on its associated strap, consisting of an arched spring portion (for a standard cell) and a flat portion (for a thimble cell). In the assembly of the grid, this backup spring band 42 is pushed behind the spring portions 22 of the strap 12 until the foot parts 32 lock into the notches 34. The grid straps 12 and 14 can then be interlocked to form the grid assembly and welded.

Preferably the straps 12 and 14, including their integral spring portions 22, are made from a material having a lower neutron capture cross section than for the backup springs 28. Moreover, the backup springs 28 would be made of a material having better radiation stress relaxation properties than those of the straps 12 and 14. A preferred material for the straps 12 and 14 is Zircaloy, while a preferred material for the backup springs is a nickel, chromium, iron alloy.

In summary, a nuclear fuel spacer grid may be created by utilizing a backup spring, made of a material chosen for its radiation stress relaxation properties, which is positioned apart from the fuel rods and behind the integral spring portion of the grid straps, with the grid straps (with integral spring portions) made of a material chosen for its low neutron capture cross section.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined by the claims appended hereto.

We claim:

1. A grid for the spacing of fuel rods in a nuclear reactor fuel assembly, comprising:

(a) an array of interleaved nuclear reactor fuel assembly grid straps, said array having an egg crate configuration defining standard cells therein for the separate enclosure of each of said fuel rods, each of said standard cells having at least one of its associated said straps with an integral spring portion projecting into said standard cell, with said integral spring portion compressibly contacting its associated said fuel rod; and (b) a number of backup springs, distinct from said straps, disposed one each traverse to and posterior to each of a plurality of said integral spring portions and spaced apart from said fuel rods; and wherein each of said backup springs compressibly contact its associated said integral spring portion; and wherein said spring portions are each flat springs which, on their associated said strap, are generally parallel and generally aligned side by side in a row, wherein said backup springs are disposed one each behind each of said integral spring portions, and wherein said backup springs, on their associated said strap for adjacent said standard cells, are integrally connected together defining a single backup spring band.

2. The grid according to claim 1, wherein each of said backup springs has an arched configuration, with foot parts, and wherein said straps have notches, generally midway between each two adjacent said integral spring portions, which lockably engage said foot parts.

3. The grid of claim 2 also for the spacing of control rod guide thimbles in said nuclear reactor fuel assembly, wherein said egg crate configuration also defines thimble cells therein for the separate enclosure of each of said control rod guide thimbles and wherein within said thimble cells, adjacent said backup springs, on their associated said strap, are integrally connected together by generally flat portions.

4. The grid of claims 1, 2, or 3 wherein said straps, including said integral spring portions, comprise a first material having a lower neutron capture cross section than that of said backup springs and wherein said backup springs comprise a second material having better radiation stress relaxation properties than those of said straps, including said integral spring portions.

5. The grid of claim 4, wherein said first material is Zircaloy and said second material is a nickel, chromium, iron alloy.

* * * * *